US012607301B2

(12) United States Patent
Cohen

(10) Patent No.: US 12,607,301 B2
(45) Date of Patent: Apr. 21, 2026

(54) COMBINED HIGH PRESSURE RECEPTACLES

(71) Applicant: STORAGE DROP LTD, Rehovot (IL)

(72) Inventor: Shay Cohen, Kfar Saba (IL)

(73) Assignee: STORAGE DROP LTD, Rehovot (IL)

( * ) Notice: Subject to any disclaimer, the term of this patent is extended or adjusted under 35 U.S.C. 154(b) by 133 days.

(21) Appl. No.: 18/275,727

(22) PCT Filed: Feb. 4, 2022

(86) PCT No.: PCT/IL2022/050152
§ 371 (c)(1),
(2) Date: Aug. 3, 2023

(87) PCT Pub. No.: WO2022/168097
PCT Pub. Date: Aug. 11, 2022

(65) Prior Publication Data

US 2024/0133518 A1 Apr. 25, 2024
US 2024/0230029 A9 Jul. 11, 2024

Related U.S. Application Data

(60) Provisional application No. 63/145,603, filed on Feb. 4, 2021.

(51) Int. Cl.
*F17C 1/00* (2006.01)
*B65D 88/76* (2006.01)
*B65D 88/78* (2006.01)

(52) U.S. Cl.
CPC .............. *F17C 1/007* (2013.01); *B65D 88/76* (2013.01); *B65D 88/78* (2013.01);
(Continued)

(58) Field of Classification Search
CPC .......... B65D 88/76; B65D 88/78; F17C 1/007
(Continued)

(56) References Cited

U.S. PATENT DOCUMENTS 3,855,809 A * 12/1974 Westling ................ B65D 88/78 114/257
7,478,975 B2 * 1/2009 Hubbard ................... F17C 9/02 405/219
(Continued)

FOREIGN PATENT DOCUMENTS

CN 102797613 11/2012
FR 2975841 11/2012
(Continued)

OTHER PUBLICATIONS

International Search Report (ISR) for PCT/IL2022/050152 mailed May 31, 2022 (7 pages).
(Continued)

*Primary Examiner* — Frederick L Lagman
(74) *Attorney, Agent, or Firm* — Jason A. Smith; Shumaker, Loop & Kendrick, LLP

(57) ABSTRACT

A system for storing air at high pressure underground or underwater includes a plurality of arrays of air tanks, each tank configured to store compressed air at a pressure of at least 40 bar. A piping system connects between an outlet of each air tank, the piping system further including at least one central port for delivering compressed air to and from a respective array. A storage receptacle surrounds the arrays and piping system, protecting the arrays and piping system from an external environment, and thermally insulating the arrays and piping system. A liquid bath is arranged within the storage receptacle. A heat exchanger is configured to maintain a temperature of the liquid bath substantially constant. The storage receptacle may be comprised of plastic pieces welded together in a modular fashion. Each piece may be a cylindrical tube configured to receive therein one or more of the arrays.

12 Claims, 5 Drawing Sheets

(52) U.S. Cl.
CPC *F17C 2201/0104* (2013.01); *F17C 2201/035* (2013.01); *F17C 2201/054* (2013.01); *F17C 2201/056* (2013.01); *F17C 2203/03* (2013.01); *F17C 2205/0111* (2013.01); *F17C 2205/0134* (2013.01); *F17C 2205/0352* (2013.01); *F17C 2221/031* (2013.01); *F17C 2223/035* (2013.01); *F17C 2227/03* (2013.01); *F17C 2270/0118* (2013.01); *F17C 2270/0142* (2013.01)

(58) Field of Classification Search
USPC .......................................................... 405/210
See application file for complete search history.

(56) References Cited

U.S. PATENT DOCUMENTS

| | | | | |
|---|---|---|---|---|
| 7,726,911 | B1 * | 6/2010 | Dempster | B63B 35/44<br>114/256 |
| 2012/0097590 | A1 | 4/2012 | Early et al. | |
| 2012/0260839 | A1 * | 10/2012 | Maher | B65D 88/78<br>114/257 |
| 2014/0261132 | A1 | 9/2014 | Zeren et al. | |
| 2015/0204484 | A1 | 7/2015 | Modirzareh et al. | |
| 2016/0207254 | A1 * | 7/2016 | Moore, Jr. | B29C 65/348 |
| 2019/0276229 | A1 | 9/2019 | Elazari-Volcani | |
| 2019/0284995 | A1 | 9/2019 | Maier | |

FOREIGN PATENT DOCUMENTS

| | | | |
|---|---|---|---|
| GB | 1603764 | | 11/1981 |
| JP | S62155399 | A | 7/1987 |
| WO | 0200003 | | 1/2002 |
| WO | 2009154930 | | 12/2009 |
| WO | 2013188163 | A1 | 2/2013 |

OTHER PUBLICATIONS

Written Opinion (WO) for PCT/IL2022/050152 mailed May 31, 2022 (7 pages).

* cited by examiner

COMBINED HIGH PRESSURE RECEPTACLES

RELATED APPLICATIONS

This application claims priority to U.S. Provisional Patent Application 63/145,603, filed Feb. 4, 2021, entitled "Combined High-Pressure Receptacle," and to International Patent Application PCT/IL2021/050691, filed Apr. 29, 2021, entitled "Hydraulic Compressed Air Energy Storage System," the contents of which are incorporated by reference as if fully set forth herein.

FIELD OF THE INVENTION

The present disclosure relates to the field of sustainable energy systems, and more specifically, but not exclusively, to a compressed air energy storage system capable of storing compressed gas, such as air, nitrogen, or carbon dioxide, at extremely high pressure while maintaining the compressed gas thermally insulated.

BACKGROUND OF THE INVENTION

Energy storage refers to accumulating and storing energy being produced at one time for use at a later time. Commonly, energy storage technologies involve the conversion of energy from a first form that is difficult to store to a second form which is more convenient and/or economical to store. Energy storage enables the accumulation and storage (herein referred to as 'Charging' or 'Charge' step) of energy at low-demand costs (i.e., being consumed from the grid when the demand is low) and the supplying of the stored energy to consumers/grid at peak-demand periods. Storage systems also allow the smoothing out of the high peaks in the output of energy production plants. Energy storage systems are often used in conjunction with renewable electricity production systems to provide uninterrupted supply during power cut hours.

One advantageous technology is Compressed Air Energy Storage (herein referred to as "CAES"), in which ambient air is compressed and stored under pressure (charging cycle) during low demand period. When electricity is required, the pressurized air is heated and expanded in an expansion turbine to drive a generator for power production. CAES offers many advantages with respect to alternative energy storage technologies. Such advantages include lower operational costs, higher safety and environmental characteristics, and improved life time and storage stability as compared to electrical storage means such as batteries. In general, CAES offers unlimited number of charge and discharge cycles, high reliability (i.e., utilizing well known mechanical elements which are being operated and maintained for decades), wide operating temperature range, modularity (i.e., effortless parallel installation of multiple tanks enabling continuous operation during maintenance/failure events), and integration into various usage applications.

In addition to provision of energy, compressed air may also be used in the provision of cooling. Specifically, a gas may be compressed during low-demand periods for energy, such as the nighttime, stored for a prolonged period of time, and then expanded in order to generate cooling during high-demand periods for energy, such as the daytime.

High-pressure receptacles for holding liquids or fluids under pressures higher than a few tenths of a bar, and of volumes higher than a few tenths of a liter, are very expensive. There is a need for high-volume and high-pressure receptacles that are highly efficient and are available at low cost.

SUMMARY OF THE INVENTION

It is an object of the present disclosure to provide an energy storage system suitable for storing large volumes of gas compressed at high pressure. The energy storage system may be integrated within a CAES energy storage system or a cooling system, so that the stored gas is available for use when desired for provision of energy or for cooling. It is another object of the present disclosure to provide an energy storage system which is suitable to be implemented in any geographic or topographic conditions, including underground or underwater. It is yet another object of the present disclosure, to provide an energy storage system which is modular and scalable for diverse applications of various sizes.

According to a first aspect, a system for storing air at high pressure underground or underwater is disclosed. The system includes a plurality of arrays of substantially cylindrical air tanks, each tank configured to store compressed air at a pressure of at least 40 bar. A piping system connects between an outlet of each respective air tank, the piping system further including at least one central port for delivering compressed air to and from a respective array. A storage receptacle surrounds the plurality of arrays and piping system, protecting the arrays and piping system from an external environment, and thermally insulating the arrays and piping system. A liquid bath is arranged within the storage receptacle containing the plurality of arrays therein. A heat exchanger is configured to maintain a temperature of the liquid bath substantially constant.

Advantageously, using arrays of air tanks rather than a single air tank allows for a maximal volume of compressed air to be stored at a comparatively minimal price, while the piping system ensures that compressed air may be selectively delivered to and from each individual air tank. In addition, the thickness of one vessel with high volume at high pressure is significantly higher than the corresponding thickness of small metal tanks, so that each array of tanks is significantly cheaper. Furthermore, the heat exchanger may be used to ensure that the compressed gas is maintained at a substantially isothermal temperature.

In another implementation according to the first aspect, the heat exchanger is above ground or above water. While the arrays of tanks may be underground or underwater in order to reduce storage costs, the heat exchanger may be above ground to enable ease of access to sources of heating or cooling.

In another implementation according to the first aspect, the storage receptacle is comprised of a plurality of plastic pieces welded together in a modular fashion. Optionally, each plastic piece is a cylindrical tube configured to receive therein one or more of the plurality of arrays.

According to a second aspect, a system for storing air at high pressure underground or underwater is disclosed. The system includes a plurality of arrays of substantially cylindrical air tanks, each tank configured to store compressed air at a pressure of at least 40 bar. A piping system connects between an outlet of each respective air tank, the piping system further including at least one central port for delivering compressed air to and from the plurality of arrays. A storage receptacle surrounds the plurality of arrays and piping system, protecting the plurality of arrays and piping system from an external environment, and thermally insulating the plurality of arrays and piping system. The storage receptacle is formed of a plurality of modular plastic pieces welded together.

Advantageously, the system according to the second aspect includes all the benefits of using arrays of air tanks as discussed above. In addition, forming the storage receptacle from a plurality of modular plastic pieces that are welded together significantly saves on the cost of the storage receptacle, as compared to alternatives such as concrete.

In another implementation according to the second aspect, each plastic piece is a cylindrical tube configured to receive therein one or more of the plurality of arrays. Advantageously, cylindrical tubes may be added or subtracted based on the total number of arrays that are desired to be implemented in the system.

In another implementation according to the second aspect, the system further includes a liquid bath within the storage receptacle containing the plurality of arrays therein. The liquid bath may further assist in regulating the temperature of the compressed air tanks and thus further prevent inefficient energy loss due to heating.

Optionally, each cylindrical air tank is oriented with its lengthwise axis parallel to a horizontal axis of the storage receptacle. Advantageously, in this orientation, the outlet of each air tank is readily accessible to a technician standing alongside the array.

Optionally, each array includes a plurality of cylindrical air tanks stacked in layers. Stacking the air tanks helps maximize the volume of air that may be stored in any given area.

Optionally, the system further includes at least one receptacle for storing therein unpressurized air, each receptacle being communicatively connected to the piping system. The at least one receptacle may include one or more large vessels, made significantly larger than the corresponding compressed air tanks.

Optionally, each compressed air tank has a volume of up between approximately 40 to 2,000 liters.

DETAILED DESCRIPTION OF THE INVENTION

Figure 1:
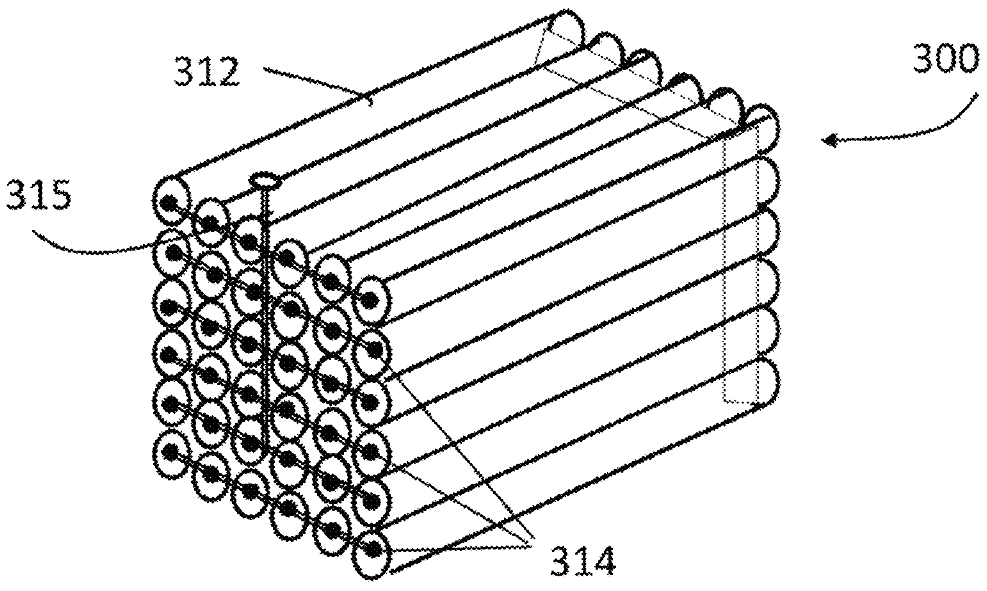
FIG. 1 is a schematic drawing illustrating an array of compressed air storage containers connected by a piping system, according to embodiments of the present disclosure.

The present disclosure relates to the field of sustainable energy systems, and more specifically, but not exclusively, to a compressed air energy storage system capable of storing compressed gas, such as air, nitrogen, or carbon dioxide, at extremely high pressure while maintaining the compressed gas thermally insulated.

Before explaining at least one embodiment of the invention in detail, it is to be understood that the invention is not necessarily limited to the details set forth in the following description and illustrated in the Examples. The invention is capable of other embodiments or of being practiced or carried out in various ways.

Referring now to FIGS. 1-4, it is more efficient and cost-effective to store large volumes of high pressure air, or other gases, in multiple small containers as compared to a single large container. Embodiments of arrays of high pressure receptacles are accordingly described below.

There are many advantages of storage in multiple small containers. These include:

Cost. In general, it is more cost-effective to store gases at higher pressures, in order to maximize energy generation per unit volume. However, high pressure receptacles that may accommodate pressures higher than 40 bar, such as 150 bar or even higher, are hard and costly to produce. The cost of production stems from mechanical and safety constraints that require a material strong enough for the production of the receptacle, as well as high-quality production processes for ensuring a hermetic volume. The cost of the receptacle exponentially grows with the volume of the receptacle. For example, a 50 $m^3$ receptacle adapted for 40 bar pressure may cost $100,000, but a receptacle adapted for 150 bar may cost four times as much as the 40-bar vessel. Generally, the cost of production and deployment of a high-pressure vessel increases linearly according to the nominal pressure, but exponentially based on the volume.

Control of Heating and Cooling. Another challenge raised by maintaining compressed gas at extremely high pressure is that the gas heats significantly when compressed and correspondingly cools when expanded. According to Gay-Lussac's law, when volume is maintained constant, temperature of a gas is directly proportional to pressure of the gas. Thus, increasing a pressure of a gas within a container from 40 bar to 80 bar, for example, has an effect of doubling its temperature. Uncontrolled cooling of air from 80 bar down to atmospheric pressure causes diversion of the stored energy, and thus reduced efficiency of an energy storage system connected to the tanks. Use of multiple small tanks also helps address this challenge. It is easier to control the volume and rate of release of air from many small tanks as compared to from a single large tank.

Flow Rate. Yet another advantage of the use of multiple small compressed air tanks is the flow rate of compressed gas from the different compressed gas tanks may be more easily regulated. This may be desirable in situations in which it is desired to generate a consistent stream of power over a period of time, as opposed to a cumulative amount of power.

Referring now to FIG. 1, a combined receptacle 300, also referred to herein as an array, includes low volume and high pressure cylinders 312. Cylinders 312 may be made of any suitable material, such as stainless steel. In exemplary embodiments, cylinders 312 are made of carbon fiber. Cylinders 312 may also be of a type that are used for storing compressed gases in other industrial contexts, such as assisted breathing, underwater diving, or workshop burners. These conventional cylinders are generally inexpensive; for example, the cost of an industrial high-pressure cylinder, having a gas volume of 40 liters and nominal pressure of 150 bar, is $30-50.

A plurality of high pressure cylinders 312 may be stacked together. Each cylinder 312 is connected to a piping system 314 for transferring the compressed air in and out of the combined receptacle 300, and includes pressure sensors and valves for regulating the volume of air in each individual cylinder 312. The piping system 314 includes a central port 315 for transferring pressurized air in and out of the combined receptacle 300. For example, the piping system may be connected to a liquid piston arrangement for compressing the air. Alternatively, the cylinders 312 may be implemented in any system that requires storage of a large quantity of compressed air, such as a cooling system.

The combined receptacle 300 is integrated in a system that includes, inter alia, a central controller. The central controller is configured to monitor the pressure readings of each cylinder 212. On the basis of these pressure readings, the controller determines which cylinder 312 to open to receive therein compressed air or to release therefrom compressed air.

Each cylinder 312 is configured to maintain compressed gas therein at a pressure of at least 40 bar. The pressure may be maintained significantly higher than 40 bar, such as 80 bar, and even as high as up to 400 bar, to thereby increase the energy storage density in that particular cylinder 312. In theory, the only upper limit for the pressure of the gas is the pressure at which the gas liquefies, for a given temperature of the gas.

One advantage of increasing the pressure at which compressed gas is maintained is that more energy is stored for the same volume of apparatus. However, storage of the gas at higher pressures also poses physical challenges. For example, the container bodies must be sufficiently strong to maintain the compressed air at such pressures. Furthermore, a single container at high pressures may be prone to leaking, which results in inefficiency. To address this concern, rather than using a single compressed gas tank with extremely thick walls, the system uses multiple cylinders 312 with comparatively smaller volumes. The smaller volume cylinders 312 may maintain the same pressures with thinner walls. Moreover, when a smaller volume tank leaks, the resulting loss of compressed air is less than that when a larger volume tank leaks.

In the illustrated embodiment, the cylinders 312 are arranged in a 6×6 array. The 6×6 array thus forms a combined receptacle with 36 different cylinders 312. In a case in which each receptacle 312 contains 40 liters and holds air at a pressure of 150 bar, the combined receptacle 300 provides, in total, storage of 1440 liters at 150 bar. The expected cost of this combined receptacle 300 is approximately half of that of a single receptacle with the same characteristics. This ratio is expected to grow as the total volume of the combined receptacle 300 increases. In alternative embodiments, the arrays may include, for example twelve or twenty four cylinders 312.

Combined receptacle 300 may be adapted for use deployed on the ground, underground, or underwater. Typically, high-volume, high-pressure containers require only minimal maintenance. Therefore, it is typically cost-effective to store such containers underground or underwater, where the storage space may be less expensive, so long as an adequate approach is left for maintenance. Deployment on ground or underground may require insertion of the combined receptacle in a protective casing, such as a shipping container. Deployment underwater requires insertion of the combined receptacle 300 in a water-tight casing, in order to protect the combined receptacle from undesired exposure to moisture and salinity.

Figure 2:
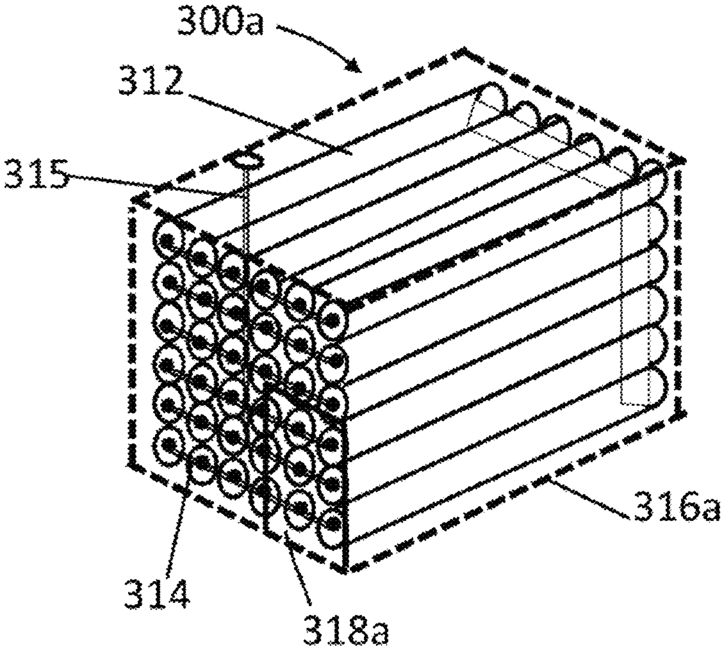
FIG. 2 is a schematic drawing illustrating the compressed air storage containers of FIG. 1 inside an above-ground storage receptacle, according to embodiments of the present disclosure.

FIG. 2 illustrates an exemplary above-ground combined receptacle 300*a*. The cylinders 312 are stored in a storage receptacle 316*a*. Receptacle 316*a* may be made of any material suitable for protecting the cylinders 312 from their environment. For example, receptacle 316 may be a commercial shipping container. Receptacle 316*a* has a service hatch 318 through which maintenance staff may access the cylinders 312 and piping 314.

Figure 3:
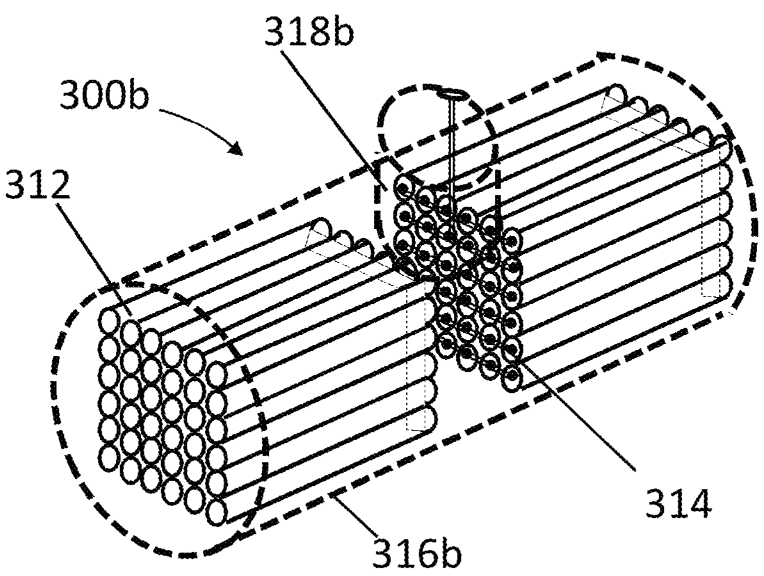
FIG. 3 is a schematic diagram illustrating the compressed air storage containers of FIG. 1 inside an underwater or underground storage receptacle, according to embodiments of the present disclosure.
Figure 4:
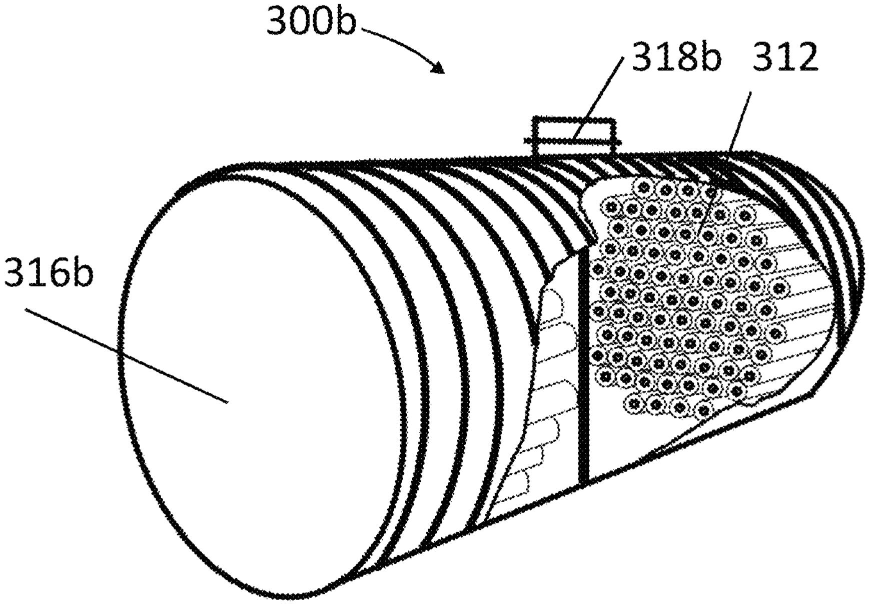
FIG. 4 is an alternative view of the compressed air storage containers of FIG. 1 in an underwater or underground storage receptacle, according to embodiments of the present disclosure.

FIGS. 3 and 4 depict an under-sea or underwater deployment system for a combined receptacle 300*b*. Combined receptacle 300*b* is stored in a storage receptacle 316*b*, which may be of plastic material formed as a watertight structure, adapted to protect the combined receptacle 300 from under-sea ambient and weather-related hazards. Receptacle 316*b* may have a maintenance entry 318 on a top portion thereof. The entry 318 may be positioned in an optimal location for an underground storage tank.

In preferred embodiments, the cylinders 312 are arranged with their longitudinal axes parallel to each other, and parallel to the horizontal axis of the storage container 316*a* or 316*b*. In addition, the cylinders may be stacked in a configuration that matches the geometry of the storage receptacle, such as in a rectangular configuration (as in FIG. 2) or in a substantially cylindrical configuration (as shown in FIG. 4). Advantageously, orienting the cylinders in this way allows for easier filling of the compressed air from the piping system 314 into each cylinder 312, as well as easy access to all of the pipes of the piping system 314 for an individual standing within the storage receptacle 316*a* or 316*b*.

Figure 5:
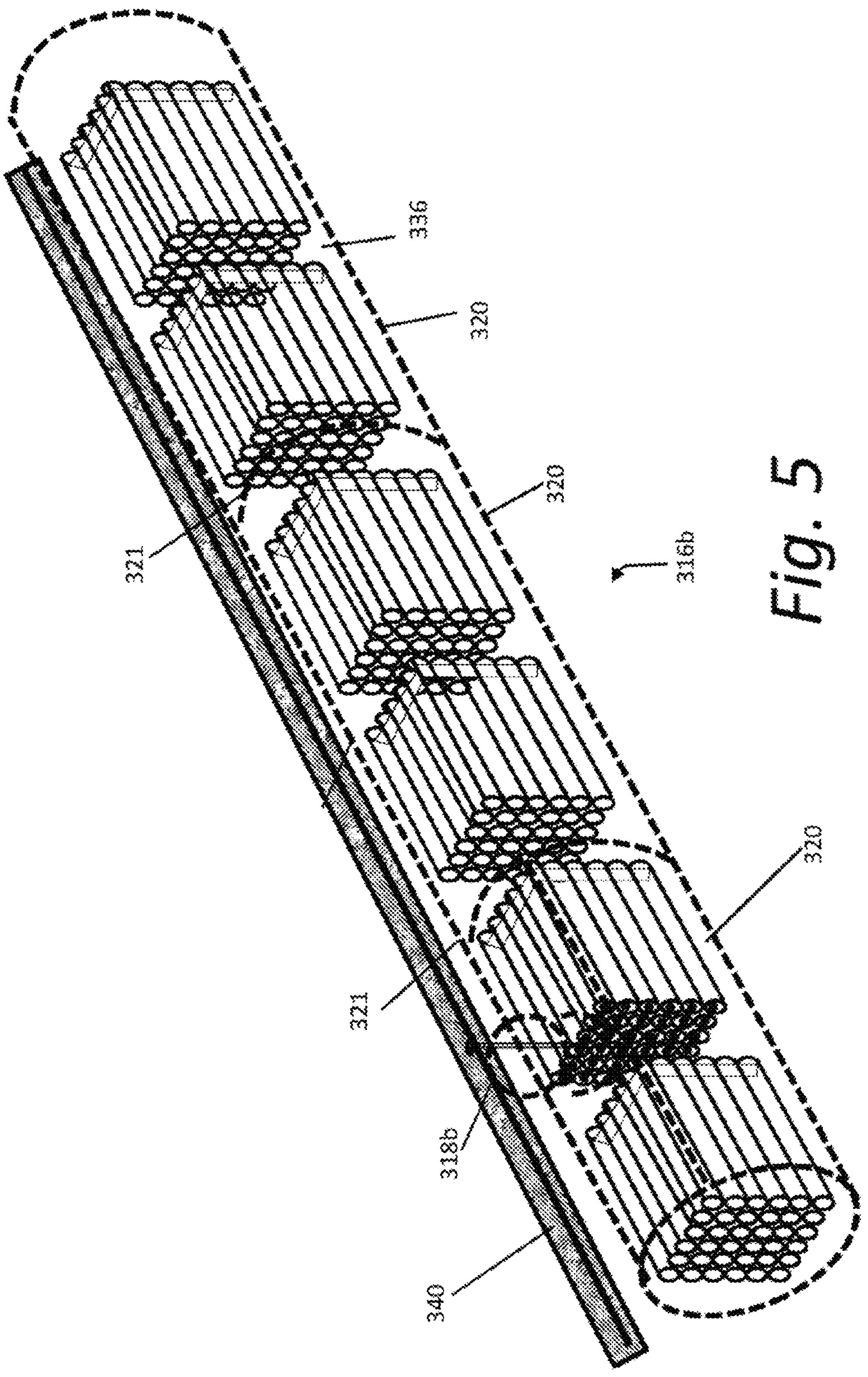
FIG. 5 illustrates the compressed air storage containers of FIG. 1 within a modular storage receptacle, according to embodiments of the present disclosure.

Referring now to FIG. 5, in preferred embodiments, multiple arrays 300 of cylinders 312 are stored in an underground or underwater storage receptacle 316*b* that is constructed from plastic pipes 320. Plastic pipes 320 may also preferably be watertight and are capable of supporting the pressure of water or earth above the plastic pipes 320.

Preferably, the plastic pipes 320 are made of, or include, insulating material that insulates the arrays 300 from variations in temperature. Maintaining the compressed gas at a consistent temperature is highly desirable in order to preserve the efficiency of the cooling or energy storage system in which the arrays 300 are installed. In addition, plastic pipes 320 may hold a liquid bath 336 therein, for further regulating the temperature of cylinders 312.

The plastic pipes 320 are welded together at joints 321. Advantageously, the plastic pipes 320 may be modular, and may be joined together at any desired length, depending on the number of arrays 300 that are to be inserted. In addition, the plastic pipes may be placed under ground level 340 more easily and at reduced cost compared to pouring concrete around similar underground gas storage arrays.

Figure 6:
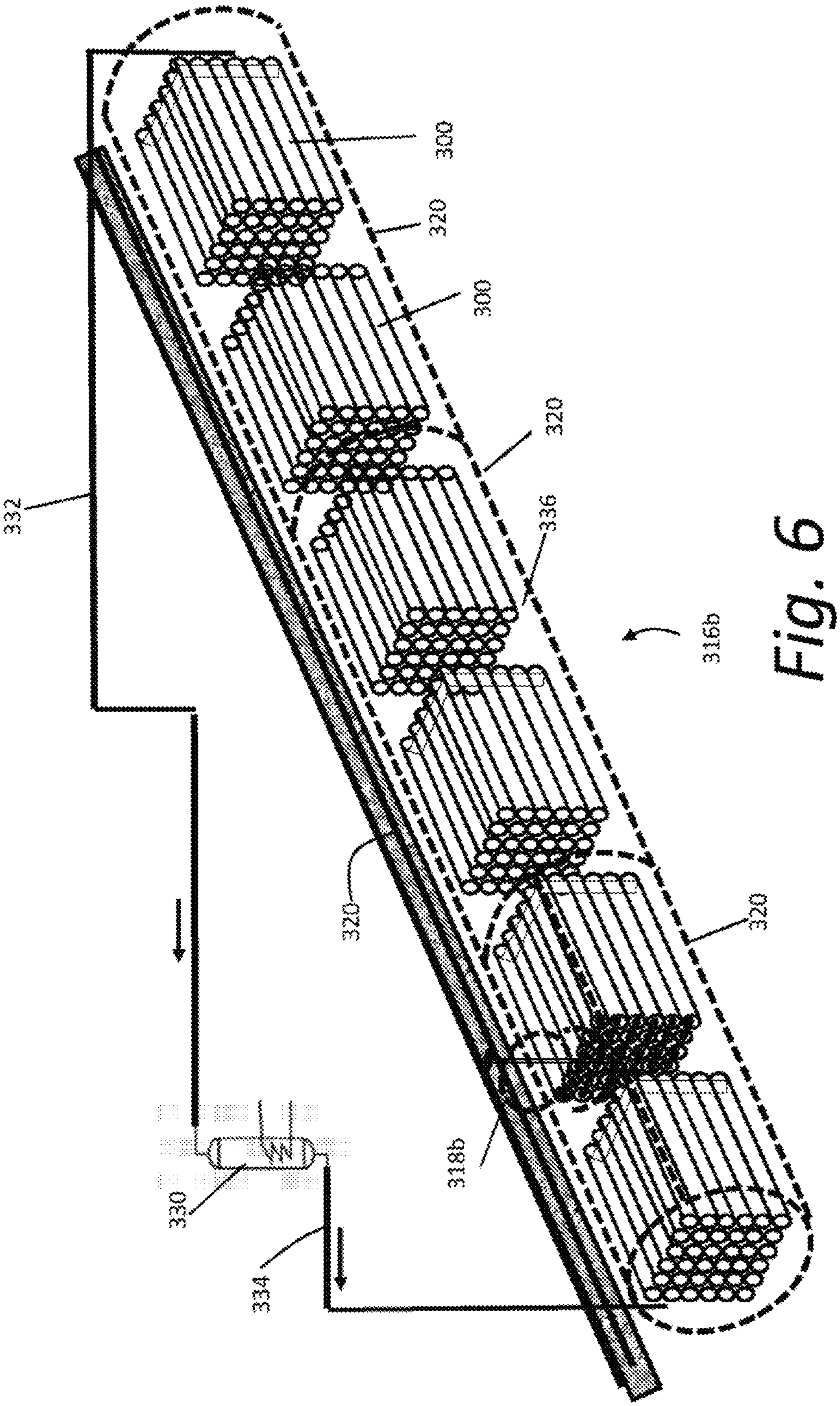
FIG. 6 illustrates the compressed air storage containers of FIG. 1 within a liquid bath that is fluidically connected to a heat-exchanger, according to embodiments of the present disclosure.

Referring now to FIG. 6, in order to maintain the temperature of liquid bath 336 at a consistent temperature, the system may be equipped with a heat exchanger 330. The heat exchanger 330 may heat or cool the liquid of the liquid bath as desired, in order to isolate the arrays 300 from any environmental temperature fluctuations. The heat exchanger 330 may also be used maintain substantially isothermal conditions in response to performance of actions during the energy storage and release cycle. For example, during filling of compressed gas into cylinders 312, it may be desirable to cool the liquid of the liquid bath 336, whereas during release of gas from cylinders 312, it may be desirable to heat the liquid of the liquid bath 336.

Figure 7:
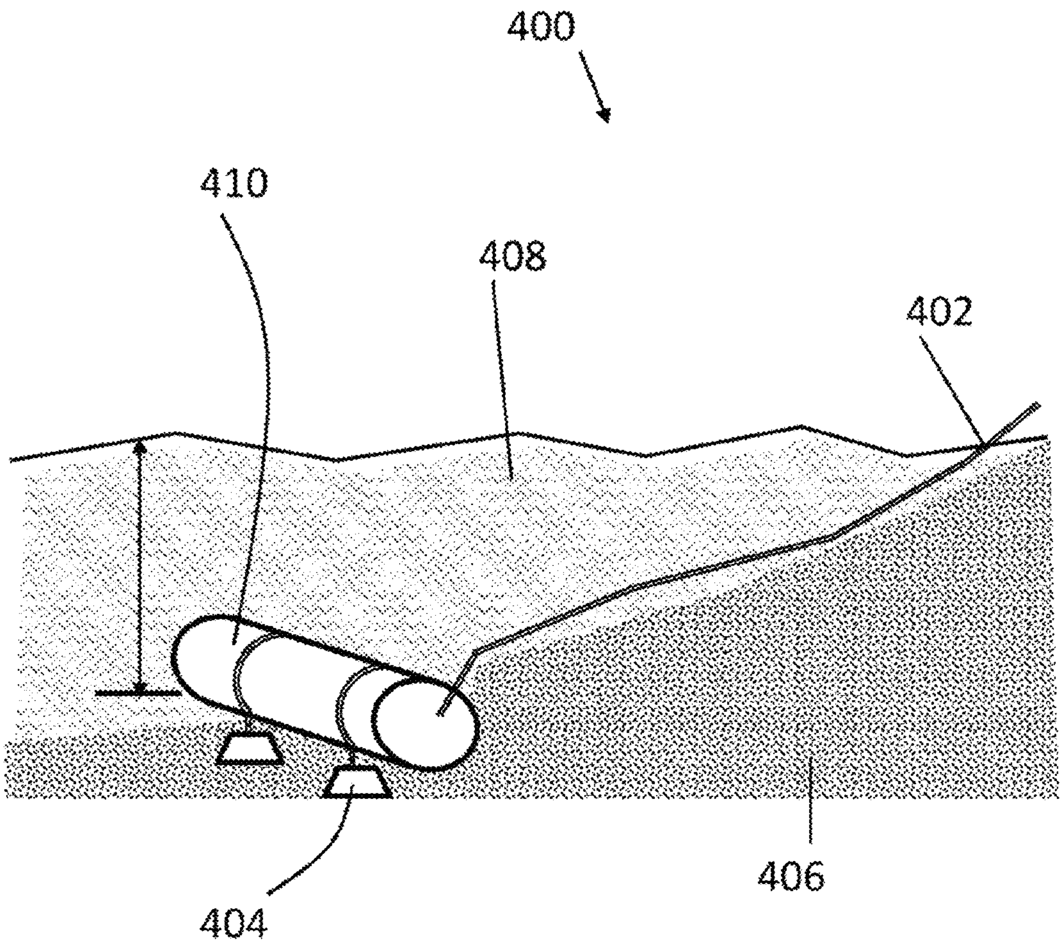
FIG. 7 is a schematic diagram illustrating an underwater storage tank for low pressure air, according to embodiments of the present disclosure.

Referring now to FIG. 7, systems for storage of energy using compressed air are characterized by two different requirements for the storage tanks. On one hand, it is necessary to have an array of high pressure tanks for storing air at pressures of 150 bar and up. This requirement is addressed by the embodiments addressed above. The other requirement relates to the very large storage volumes required for the uncompressed air. In certain embodiments, the uncompressed air may be drawn from ambient atmosphere. However, when the compressed air storage tanks are stored underwater, it may be advantageous to likewise retain a store of uncompressed air underwater, so that the entire system may be run entirely underwater.

FIG. 7 depicts an exemplary low-pressure underwater large volume storage system 400. According to embodiments of the present disclosure, system 400 may contain one or more large tanks 410. The tanks 400 may be made of plastic, rubber, or a similar lightweight material. The tanks 410 may be deployed under sea-level not far away from the shore, at depths of 20-40 meters, thereby taking advantage of the sea water pressure at the installation level, which may be as high as a few bars. Tank 410 may be tied or anchored to by bottom of the sea by heavy objects 404, which may be, for example, concrete blocks or sand bags. One or more pipes 402 may connect tank 410 to an on-shore installation. In alternative embodiments, pipes 402 connect tank 410 to an underwater installation.

Although embodiments of the present disclosure have been described by way of illustration, it will be understood that disclosed embodiments may be carried out with many variations, modifications, and adaptations, without exceeding the scope of the claims.

The invention claimed is:

1. A system for storing air at high pressure underground or underwater, comprising:

a plurality of arrays of substantially cylindrical air tanks, each tank configured to store compressed air at a pressure of at least 40 bar;

a piping system connecting between an outlet of each respective air tank, the piping system further including at least one central port for delivering compressed air to and from a respective array;

a storage receptacle surrounding the plurality of arrays and piping system, protecting the arrays and piping system from an external environment, and thermally insulating the arrays and piping system, a liquid bath within the storage receptacle containing the plurality of arrays therein; and a heat exchanger configured to maintain a temperature of the liquid bath substantially constant.

2. The system of claim 1, wherein the heat exchanger is above ground or above water.

3. The system of claim 1, wherein the storage receptacle is comprised of a plurality of plastic pieces welded together in a modular fashion.

4. The system of claim 3, wherein each plastic piece is a cylindrical tube configured to receive therein one or more of the plurality of arrays.

5. The system of claim 1, wherein each cylindrical air tank is oriented with its lengthwise axis parallel to a horizontal axis of the storage receptacle.

6. The system of claim 1, wherein each array of the plurality of arrays comprises a plurality of cylindrical air tanks stacked in layers.

7. The system of claim 1, further comprising at least one receptacle for storing therein unpressurized air, each receptacle being communicatively connected to the piping system.

8. The system of claim 1, wherein each compressed air tank has a volume-of-up between approximately 40 to 2,000 liters.

9. The system of claim 1, wherein each cylindrical air tank is oriented with its lengthwise axis parallel to a horizontal axis of the storage receptacle.

10. The system of claim 1, wherein each array of the plurality of arrays comprises a plurality of cylindrical air tanks stacked in layers.

11. The system of claim 1, further comprising at least one receptacle for storing therein unpressurized air, each receptacle being communicatively connected to the piping system.

12. The system of claim 1, wherein each compressed air tank has a volume between approximately 40 to 2,000 liters.

* * * * *